United States Patent Office 3,501,485
Patented Mar. 17, 1970

3,501,485
CERTAIN PYRIDINEMETHANOL CARBAMATE DERIVATIVES
Takio Shimamoto, 13, Kitamachi, Shinjuku-ku, Tokyo, Japan; and Masayuki Ishikawa and Hisako Ishikawa, both of 17, 4-chome, Tokiwadaira, Matsudo-shi, Japan; Michiro Inoue, 26, 6-chome, Kokuryocho, Chofu-shi, and Tatsuo Shimamoto, 1–53 Kotakecho, Nerima-ku, both of Tokyo, Japan
No Drawing. Filed Feb. 6, 1968, Ser. No. 703,259
Claims priority, application Japan, Feb. 16, 1967, 42/9,533; Apr. 17, 1967, 42/24,028
Int. Cl. C07d 31/44
U.S. Cl. 260—295.5               7 Claims

ABSTRACT OF THE DISCLOSURE

New carbamates of pyridine-methanol derivatives for pharmaceutical use, which are represented by the general formula:

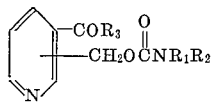

wherein $R_1$ and $R_2$ each represent a hydrogen atom, or an alkyl, aryl, or aralkyl group, or $R_1$ and $R_2$ together form a divalent alkylene group, $R_3$ represents an alkyl, hydroxy, alkoxy, amino, alkylamino, or dialkylamino group, and the group

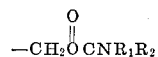

is in the 2- or 6-position, and their manufacture.

---

The preferred embodiment of the present invention relates to new carbamates of pyridine-methanol derivatives for pharmaceutical use, and their manufacture. In one aspect the invention consists in carbamates of pyridine-methanol derivatives which are represented by the general formula:

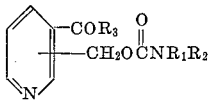

(V)

wherein $R_1$ and $R_2$ each represent a hydrogen atom, or a lower alkyl, phenyl, or benzyl group, or $R_1$ and $R_2$ together with the nitrogen to which they are attached form a piperidine ring, $R_3$ represents a lower-alkyl, hydroxy, lower-alkoxy, amino, lower-alkylamino and dilower-alkylamino group, and the group

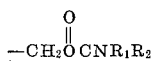

is in the 2- or 6-position.

These compounds are useful in the treatment of inflammatory diseases including rheumatic disorders such as rheumatic fever and rheumatoid arthritis.

The new compounds can be manufactured by (a) reacting a compound of the general formula

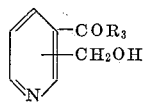

(I)

wherein $R_3$ has the same meanings as in the Formula V, and the —$CH_2OH$ group is at the 2- or 6-position, with a compound of the general formula:

R'NCO               (II)

wherein R' represents an alkyl, aryl or aralkyl group, or (b) converting a compound of the general Formula I by a known process to an aryloxyformate ester of the general formula:

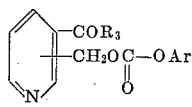

(III)

wherein Ar represents an aryl group, preferably a phenyl group, which may be substituted with a halogen atom or an alkyl, alkoxy, or nitro group, and thereafter reacting the aryloxyformate with ammonia or an amino of the general formula:

$NHR_1R_2$              (IV)

wherein $R_1$, $R_2$, and $R_3$ have the meanings given above.

In the process (a), the compound of (I) is reacted with an equimolar quantity or an excess, especially between 1.5 and 2 moles, of the isocyanate (II) in an inert solvent or diluent, such as benzene, toluene, chlorobenzene, acetonitrile, chloroform, tetrahydrofuran, or pyridine. The reaction is preferably carried out at a temperature between room temperature and 150° C., especially under 100° C. If necessary, a catalyst such as a tertiary amine, for example trimethylamine, triethylamine, an N-alkyl-piperidine or pyridine, may be used. In place of the isocyanate (II), compounds which can be converted to such an isocyanate under the reaction conditions can be used, with if necessary a catalyst to promote such conversion. For example, acyl azides represented by the formula $R'CON_3$ or S-alkyl thiolcarbamates represented by the formula R'NHCOS-alkyl may be used with heat; S-alkyl thiolcarbamates may also be used in the presence of a trialkylamine and a heavy metal salt such as silver nitrate. This process can only be used to make compounds in which $R_1$ but not $R_2$ is hydrogen, since the radical R' in the starting material become the radical $R_2$ in the product.

In the process (b), the compound of Formula I can for example be converted to an aryloxyformate ester by reaction with an aryl chloroformate, and the aryloxyformate ester (III) reacted with the ammonia or amine (IV) at a temperature between 0° and 100° C., preferably at around room temperature. The reaction can be represented by the following scheme.

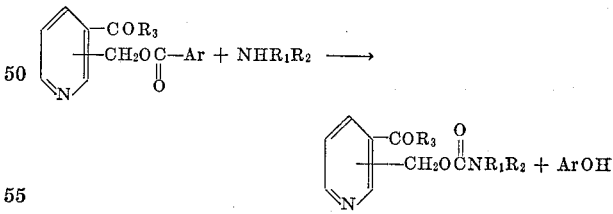

The reaction can be effected in the presence or absence of solvents or diluents, e.g. methanol, ethanol, or another low molecular alcohol. The presence of water does not hinder the reaction. When $R_3$ is an alkoxy group, it is preferable (a) to maintain the concentration of ammonia or the amine in the reaction mixture below 10%, especially below 5% (b) to use between 1 and 3 moles of ammonia or the amine, and (c) to effect the reaction at a relatively low temperature (between 0 and 50° C.), especially around room temperature, so as to reduce or prevent the formation of undesirable amides.

The compound (III) can be manufactured from 6-hydroxymethylnicotinic acid (of J. Chem. Soc. 1841, 1963) by reaction with an arylchloroformate, preferably aryl phenyl or a substituted phenyl chloroformate. For example, chlorine and bromine substituted phenyl chloroformates e.g. p-chlorophenyl chloroformate and p-bromophenyl chloroformate, and α- and β-naphthyl chloroformates may be mentioned.

Whatever method of manufacture is used, the products can be separated and purified by conventional methods as described hereinafter.

The invention is illustrated by the following examples in which "parts" are by weight except where otherwise stated, and "parts by weight" relate to "parts by volume" as gram to ml.

EXAMPLE 1

To a solution of 6.7 parts of 2-hydroxymethyl-5-acetyl-pyridine in 30 parts by volume of pyridine was added 7.2 parts by volume of methyl isocyanate. The solution was allowed to stand at room temperature for 12 hours, and then heated for 2 hours at 100° C. The solvent was distilled off under reduced pressure, and the residue was recrystallised from ether-petrol ether to obtain 8.2 parts of 2-hydroxymethyl-5-acetyl-pyridine N-methylcarbamate melting at 93° C.

*Analysis.*—Calculated (percent): C, 57.68; H, 5.81; N, 13.46. Found (percent): C, 57.59; H, 5.66; N, 13.36.

EXAMPLES 2–6

In a similar manner to Example 1, the following products were obtained from the following starting compounds and methyl isocyanate in a similar yield.

Example 2

Starting compound: 6-hydroxymethyl-nicotinamide
Product: 6-hydroxymethyl-nicotinamide N-methylcarbamate

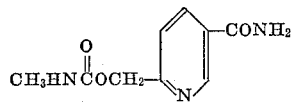

Melting point: 182–183° C. (from water)

Example 3

Starting compound: 6-hydroxymethyl-nicotinic acid N-methylamide
Product:

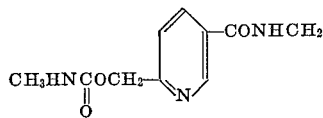

Melting point: 175–177° C. (from ethyl acetate)

Example 4

Starting compound: 2-hydroxymethyl-nicotinic acid
Product: 2-hydroxymethyl-nicotinic acid N-methylcarbamate

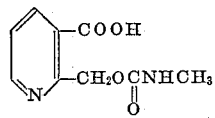

Melting point: 195–198° C. (from methanol)

Example 5

Starting compound: 6-hydroxymethyl-nicotinic acid
Product: 6-hydroxymethyl-nicotinic acid N-methylcarbamate

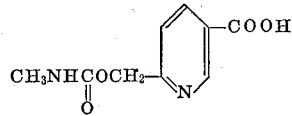

Melting point: 193–195° C. (from methanol)

Example 6

A solution of 3 parts of 2-hydroxymethyl-5-carbo-ethoxy-pyridine and 1.4 parts of phenyl isocyanate in 30 parts by volume of pyridine was heated for 3 hours at 100° C. The solvent was distilled off under reduced pressure, and the resulting residue was recrystallized from methanol to obtain 4 parts of 2-hydroxymethyl-5-carboethoxy-pyridine N-phenylcarbamate melting at 91–93° C., which has the following formula.

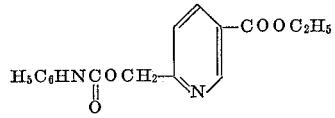

*Analysis.*—Calculated (percent): C, 63.99; H, 5.37; N, 9.33. Found (percent): C, 64.03; H, 5.32; N, 9.56.

EXAMPLE 7

To 2 parts of 2-hydroxymethyl-5-carboethoxy-pyridine phenoxyformate was added a solution of monoethylamine in methanol which was prepared from 4 parts by volume of 30% aqueous monoethylamine and 100 parts by volume of methanol. The reaction mixture was allowed to stand at room temperature over night. The mixture was concentrated under reduced pressure, diluted with water, and extracted with ether. The ether extract was recrystallized from ether-hexane to obtain 1 part of crystals melting at 74–75° C. The product has the following formula.

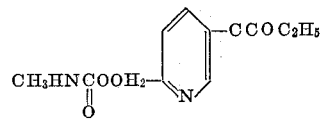

*Analysis.*—Calculated (percent): C, 55.16; H, 5.99; N, 11.58. Found (percent): C, 55.45; H, 5.92; N, 11.58.

2-hydroxymethyl-5-carboethoxy - pyridine phenoxyformate used as the starting compound was prepared in the following way.

To a solution of 2 parts of 2-hydroxymethyl-5-carboethoxy-pyridine was added a mixture of 4.3 parts of phenyl chloroformate and 30 parts by volume of dioxane while cooling and stirring. The reaction mixture was allowed to stand at room temperature over night, and then 2 parts by volume of pyridine added. The organic solvents were distilled off under reduced pressure, the residue was diluted with water, and then extracted with ether. The ether-extract was recrystallized from ether-hexane to obtain 2.8 parts of crystals melting at 61–63° C. The product has the following formula.

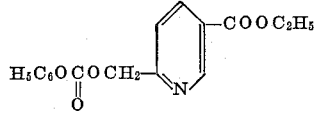

EXAMPLE 8

To a solution of one part by volume of 28% aqueous ammonia in 10 parts by volume of methanol was added one part of 2-hydroxy-methyl-5-carboethoxy-pyridine p-bromphenylformate, and the mixture was allowed to stand for 3 hours at room temperature. The mixture was concentrated under reduced pressure, diluted with water, and the resulting precipitate was filtered off. The precipitate was recrystallized from methanol to obtain 0.4 part of 2-hydroxymethyl-5-carboethoxy-pyridine carbamate melting at 165–166° C.

*Analysis.*—Calculated (percent): C, 53.43; H, 5.43; N, 12.25. Found (percent): C, 53.57; H, 5.39; N, 12.50.

The starting compound, 2 - hydroxymethyl-5-carboethoxy-pyridine p-bromphenoxyformate was prepared in a similar manner to Example 7, except that an equimolar amount of p-bromophenyl chloroformate was used. The p-bromphenoxyformate melted at 69–70° C.

EXAMPLE 9

To a solution of 6 parts of volume of 40% aqueous dimethylamine in 100 parts by volume of methanol was added 8 parts of 2-hydroxymethyl-5-carboethoxy-pyridine p-bromphenoxyformate. The reaction mixture was allowed to stand at room temperature over night, and then the solvent was distilled off under reduced pressure. The residue was dissolved in ether, the solution was washed with 5% sodium hydroxide solution and the ether was distilled off. The oily residue was distilled under high vacuum. The distillate was characterized as the expected 2-hydroxymethyl-5-carboethoxy-pyridine N,N-dimethylcarbamate by IR spectrum. The IR spectrum showed the following absorption maxima.

λ max. 3000, 1720, 1600, 1490, 1450, 1400, 1380, 1350, 1300, 1180, , 1120, 1070, 1020, 830 cm.$^{-1}$.

EXAMPLES 10–11

In a similar manner to Examples 7–9, the following products were obtained.

Example 10

Products:

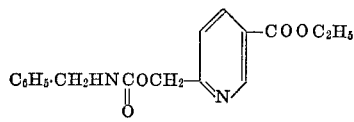

Melting point: 94–96 C. (from ether)

Example 11

Product:

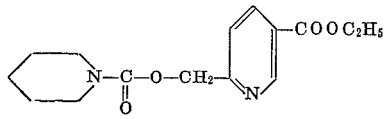

Melting point: 85–87° C. (from ether)

EXAMPLE 12

(Clinical example)

2 - hydroxymethyl-5-carboethoxy-pyridine N-methylcarbamate was orally administered in a does of 5 to 30 mg. per kg. a day. In adults 0.3 g., 0.5 g. or 1 g. of this substance was commonly used once or twice a day. The most common usage in adults is one gram of this substance once a day and in children it is 30 mg. per kg. once a day. A long term treatment with this substance was possible and there was found no appreciable untoward effect. The clinical action was rapid, and almost twelve hours after the administration of this substance, the edematous swelling, heat and redness of joints or petechiae in non-specific inflammatory or rheumatic disorders disappeared and the morning stiffness seen in rheumatoid arthritis showed a definite improvement. The daily administration gave a favorable effect on the course of various inflammatory conditions and purpuric conditions. Various angitis responded to this compound when this compound was administered as a long term treatment over 5 weeks.

What we claim is:

1. Carbamates of pyridine-methanol derivatives of the general formula:

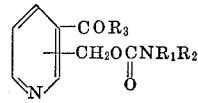

wherein $R_1$ and $R_2$ each represent a hydrogen atom, or a lower-alkyl, phenyl or benzyl, $R_3$ represents a lower-alkyl, hydroxy, lower-alkoxy, amino, lower alkylamino, or dilower-alkylamino group, and the group

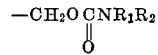

is the 2- or 6-position.

2. 2-hydroxymethyl-5-carboxy-pyridine N - methylcarbamate.

3. 2-hydroxymethyl-3-carboxy-pyridine N - methylcarbamate.

4. 2-hydroxymethyl-5-carboethoxy-pyridine N - methylcarbamate.

5. 2-hydroxymethyl-5-carboethyl-pyridine N - ethylcarbamate.

6. 2-hydroxymethyl-3-carboethyl-pyridine N - methylcarbamate.

7. 2-hydroxymethyl-3-carboethoxy-pyridine N - ethylcarbamate.

References Cited

UNITED STATES PATENTS 3,404,152  10/1968  Thiele et al. _____ 260—295

NORMA S. MILESTONE, Primary Examiner

A. L. ROTMAN, Assistant Examiner

U.S. Cl. X.R.

260—294, 295; 424—266

UNITED STATES PATENT OFFICE
CERTIFICATE OF CORRECTION

Patent No. 3,501,485　　　　　　　　　　Dated　March 17, 1970

Inventor(s) SHIMAMOTO ET AL

It is certified that error appears in the above-identified patent and that said Letters Patent are hereby corrected as shown below:

Column 4, line 27, change $CCOC_2H_5$ to read "$COOC_2H_5$"

Column 5, line 41, change does to read "dose"

Column 6, line 32, change carboethyl to read "carboethoxy"

Column 6, line 34, change carboethyl to read "carboethoxy"

Signed and sealed this 23rd day of May 1972.

(SEAL)
Attest:

EDWARD M. FLETCHER, JR.　　　　ROBERT GOTTSCHALK
Attesting Officer　　　　　　　　Commissioner of Patents